(12) United States Patent
He et al.

(10) Patent No.: US 12,509,787 B2
(45) Date of Patent: Dec. 30, 2025

(54) MEMBRANE-STACKED ELECTROLYTIC BATH FOR LITHIUM EXTRACTION FROM SALT LAKES BY ELECTROCHEMICAL INTERCALATION/DEINTERCALATION

(71) Applicant: CENTRAL SOUTH UNIVERSITY, Changsha (CN)

(72) Inventors: Lihua He, Changsha (CN); Zhongwei Zhao, Changsha (CN); Xuheng Liu, Changsha (CN)

(73) Assignee: CENTRAL SOUTH UNIVERSITY, Changsha (CN)

( * ) Notice: Subject to any disclaimer, the term of this patent is extended or adjusted under 35 U.S.C. 154(b) by 531 days.

(21) Appl. No.: 18/086,681

(22) Filed: Dec. 22, 2022

(65) Prior Publication Data

US 2023/0203687 A1 Jun. 29, 2023

(30) Foreign Application Priority Data

Dec. 28, 2021 (CN) .......................... 202123335018.1

(51) Int. Cl.
*C25C 1/00* (2006.01)
*C25C 1/02* (2006.01)
*C25C 7/02* (2006.01)
*C25C 7/04* (2006.01)

(52) U.S. Cl.
CPC ................. *C25C 1/02* (2013.01); *C25C 7/02* (2013.01); *C25C 7/04* (2013.01)

(58) Field of Classification Search
CPC ................. C25C 1/02; C25C 7/02; C25C 7/04
See application file for complete search history.

(56) References Cited

U.S. PATENT DOCUMENTS

2016/0168730 A1* 6/2016 Watanabe ................. C25B 1/02

\* cited by examiner

*Primary Examiner* — Zulmariam Mendez
(74) *Attorney, Agent, or Firm* — Bayramoglu Law Offices

(57) ABSTRACT

A membrane-stacked electrolytic bath for lithium extraction from salt lakes by electrochemical intercalation/deintercalation includes a positioning supporting plate as well as a first compressing plate, a first rubber gasket, at least one electrochemical intercalation/deintercalation unit, a second rubber gasket, and a second compressing plate which are sequentially arranged in an overlapped manner; a compressing apparatus for abutting against the second compressing plate is arranged on one side of the second compressing plate to enable peripheral edges of the first compressing plate, the first rubber gasket, the electrochemical intercalation/deintercalation unit, the second rubber gasket, and the second compressing plate to be sealed; the first compressing plate is provided with water outlet pipes communicated with the electrochemical intercalation/deintercalation unit; and the second compressing plate is provided with water inlet pipes communicated with the electrochemical intercalation/deintercalation unit.

9 Claims, 8 Drawing Sheets

MEMBRANE-STACKED ELECTROLYTIC BATH FOR LITHIUM EXTRACTION FROM SALT LAKES BY ELECTROCHEMICAL INTERCALATION/DEINTERCALATION

CROSS REFERENCE TO THE RELATED APPLICATIONS

This application is based upon and claims priority to Chinese Patent Application No. 202123335018.1, filed on Dec. 28, 2021, the entire contents of which are incorporated herein by reference.

TECHNICAL FIELD

The present application belongs to the technical field of lithium extraction from salt lakes, and particularly relates to a membrane-stacked electrolytic bath for lithium extraction from salt lakes by electrochemical intercalation/deintercalation.

BACKGROUND

With the rapid development of new energy automobiles, the demand of power batteries for lithium has been rapidly increased in recent years. In the aspect of price, the average price of lithium carbonate in 2020 was 50,000 Yuan/ton, but the price of lithium carbonate remained at 200,000 Yuan/ton in December 2021, however, lithium carbonate was still in short supply. The main sources of lithium carbonate include lithium extraction from salt lakes, lithium extraction from ores and waste battery recycling, among which the lithium resource reserve in the salt lakes is huge and accounts for about 70% of the global lithium resources. Therefore, efficient, rapid and pollution-free extraction of lithium resources from the salt lakes has important significance for guaranteeing sustainable development of the lithium industry.

At present, the achieved industrial technologies for lithium extraction from salt lakes mainly include a precipitation method, an adsorption method, an extraction method, an electrodialysis method and the like. However, all of these technologies have certain limitations. For example, the precipitation method is only suitable for treating high-quality salt lake brine which has a low magnesium-lithium ratio, and it requires a long process of tedding in a salt field for concentrating; the adsorption method has the problems of being low in adsorption capacity, large in adsorbent solution loss, large in water consumption and the like; the extraction method has the problem that the lithium extraction rate is high, but a small amount of extraction agent is dissolved in the brine, which easily causes serious environment pollution; and as it requires that the lithium content of monovalent cations such as sodium and potassium in the brine should be as low as possible, the electrodialysis method is only suitable for treating old salt lake brine.

Due to the characteristics of low concentration, high mineralization degree, high viscosity and the like of lithium ions in the brine, the lithium extraction rate in the process of lithium extraction from salt lakes by electrochemical intercalation/deintercalation is low. In addition, an apparatus for lithium extraction from salt lakes by electrochemical intercalation/deintercalation has the problems of large electrode spacing, insufficient brine flowing, poor solution mass transfer effect and the like, which seriously influence the lithium extraction rate in the process of lithium extraction from salt lakes by electrochemical intercalation/deintercalation.

SUMMARY

An objective of an embodiment of the present application is to provide a membrane-stacked electrolytic bath for lithium extraction from salt lakes by electrochemical intercalation/deintercalation, so as to solve the technical problem of low lithium extraction rate in the prior art.

To achieve the above objective, the following technical solutions are used in the present application: a membrane-stacked electrolytic bath for lithium extraction from salt lakes by electrochemical intercalation/deintercalation is provided, which includes a positioning supporting plate, as well as a first compressing plate, a first rubber gasket, at least one electrochemical intercalation/deintercalation unit, a second rubber gasket and a second compressing plate sequentially arranged on the positioning supporting plate in an overlapped manner; a compressing apparatus for abutting against the second compressing plate is arranged on one side of the second compressing plate, so as to enable peripheral edges of the first compressing plate, the first rubber gasket, the electrochemical intercalation/deintercalation unit, the second rubber gasket and the second compressing plate to be sealed; the first compressing plate is provided with water outlet pipes communicated with the electrochemical intercalation/deintercalation unit; and the second compressing plate is provided with water inlet pipes communicated with the electrochemical intercalation/deintercalation unit.

In one embodiment, the electrochemical intercalation/deintercalation unit includes a first water distribution plate, an anode plate, a second water distribution plate, a first anion permlselective membrane, a third water distribution plate, a cathode plate, a fourth water distribution plate and a second anion permlselective membrane sequentially arranged in an overlapped manner; the first water distribution plate, the anode plate, the second water distribution plate, the first anion permlselective membrane, the third water distribution plate, the cathode plate, the fourth water distribution plate and the second anion permlselective membrane are each provided with a plurality of liquid passing holes arranged at equal intervals, where the number of the liquid passing holes is larger than or equal to the number of the water inlet pipes or the water outlet pipes; and the corresponding water inlet pipes or water outlet pipes and the corresponding liquid passing holes are positioned on a same axis.

In one embodiment, the positioning supporting plate is an L-shaped antirust steel plate, and a thickness of the positioning supporting plate is 5-100 mm.

In one embodiment, the first compressing plate and the second compressing plate are antirust steel plates, and thicknesses of the first compressing plate and the second compressing plate are 5-100 mm; at least six water outlet pipes are arranged on the first compressing plate at equal intervals; and at least six water inlet pipes are arranged on the second compressing plate at equal intervals.

In one embodiment, the first rubber gasket and the second rubber gasket both are nitrile rubber gaskets, chloroprene rubber gaskets, ethylene-propylene-diene monomer gaskets or silicone rubber gaskets with thicknesses of 3-20 mm; and the first water distribution plate, the second water distribution plate, the third water distribution plate and the fourth water distribution plate all are one of PVC plates, PE plates, PP plates and PPH plates.

In one embodiment, the first water distribution plate, the second water distribution plate, the third water distribution plate and the fourth water distribution plate each includes a water distribution frame, a water distribution grid arranged in the water distribution frame, and fluid flow channels arranged in the water distribution frame; one end of the fluid flow channel communicates with the water distribution grid and the other end communicates with the corresponding liquid passing hole; and the fluid flow channels in the first water distribution plate and the second water distribution plate are staggered from the fluid flow channels in the third water distribution plate and the fourth water distribution plate.

In one embodiment, the anode plate is an anode plate coated with a lithium-intercalated active substance; the cathode plate is a cathode plate coated with a lithium-deficient active substance; and the first anion permlselective membrane and the second anion permlselective membrane both are monovalent anion permlselective membranes with thicknesses of less than 0.5 mm and resistances of less than 30 $\Omega/cm^2$.

In one embodiment, the lithium-intercalated active substance is one of $LiFePO_4$, $LiMn_2O_4$ and $LiNi_xCo_yMn_{1-x-y}O_2$, where $0<x+y<1$, and the lithium-deficient active substance is one of $Li_{1-x}FePO_4$, $Li_{1-x}Mn_2O_4$ and $Li_{1-x}Ni_yCo_zMn_{1-y-z}O_2$, where $0<x<1$, and $0<y+z<1$.

In one embodiment, current collectors and tabs on the cathode plate and the anode plate are one of titanium meshes, titanium foils and carbon fiber cloth.

In one embodiment, sealing strips are arranged on peripheral edges of the cathode plate and the anode plate.

The membrane-stacked electrolytic bath for lithium extraction from salt lake by electrochemical intercalation/deintercalation provided by the present application has the beneficial effects that the peripheral edges of the first compressing plate, the first rubber gasket, the electrochemical intercalation/deintercalation unit, the second rubber gasket and the second compressing plate are sealed and arranged in the overlapped manner, in this way, assembling is convenient, and water leakage is prevented; the spacing between electrodes is reduced, the solution resistance can be better reduced, the power consumption for lithium extraction is reduced, and energy-saving extraction of the lithium resources from the salt lake is achieved; and due to the modularization of the electrochemical intercalation/deintercalation unit, the solution distribution is uniform, thus the concentration difference is reduced, the reaction rate is increased, and the lithium extraction rate is increased.

BRIEF DESCRIPTION OF THE DRAWINGS

To describe the technical solutions in the embodiments of the present application more clearly, the following briefly introduces the accompanying drawings required for describing the embodiments or the related art. Apparently, the accompanying drawings in the following description show only some embodiments of the present application, and a person of ordinary skill in the art may still derive other accompanying drawings from these accompanying drawings without creative efforts.

Figure 1:
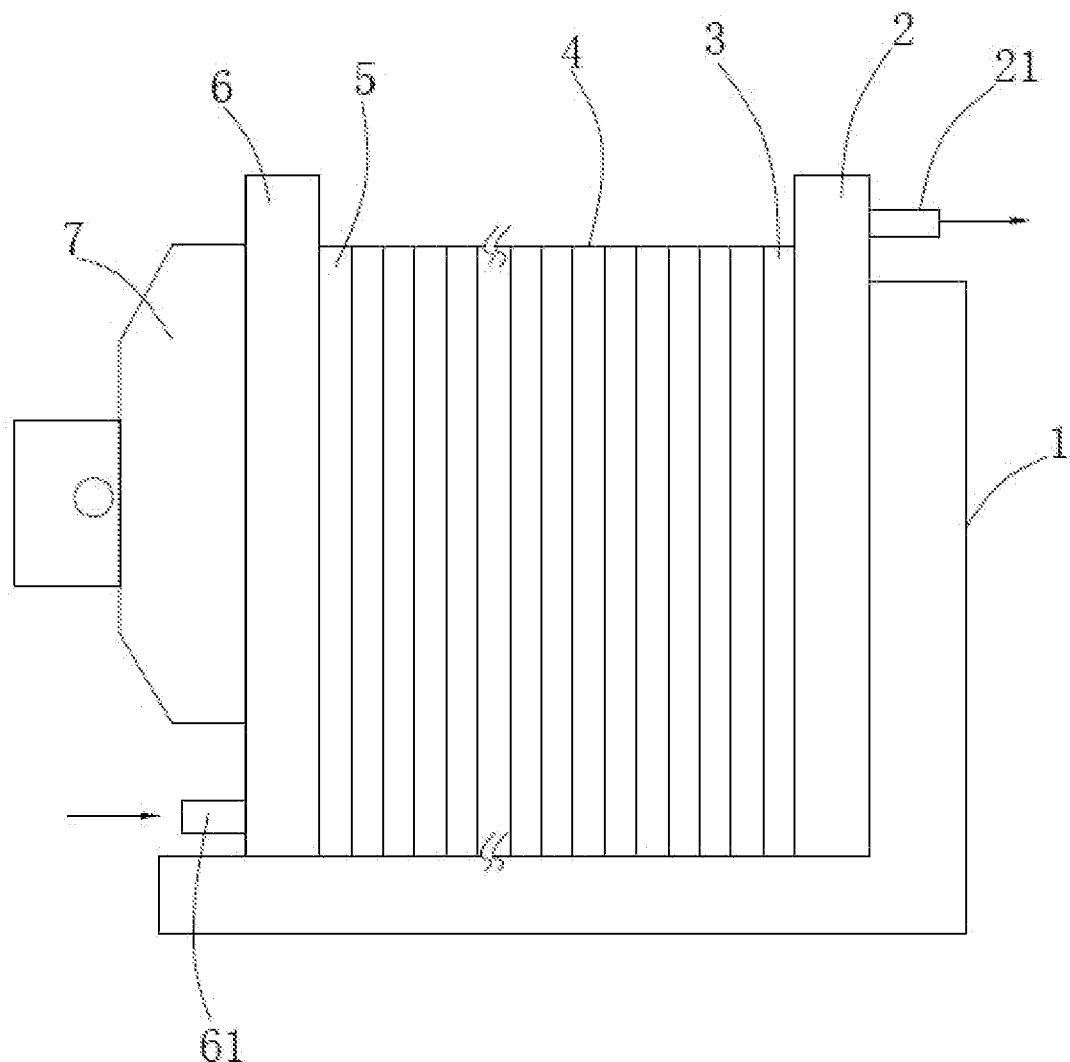
FIG. 1 is a schematic structure diagram of a main view of a membrane-stacked electrolytic bath for lithium extraction from salt lakes by electrochemical intercalation/deintercalation provided by an embodiment of the present application.

Reference numerals in the accompanying drawings are as follows:

1, positioning supporting plate; 11, L-shaped positioning groove; 2, first compressing plate; 21, water outlet pipe; 3, first rubber gasket; 4, electrochemical intercalation/deintercalation unit; 41, first water distribution plate; 411, water distribution frame; 412, water distribution grid; 413, fluid flow channel; 42, anode plate; 421, current collector; 422, tab; 423, sealing strip; 43, second water distribution plate; 44, first anion permlselective membrane; 45, third water distribution plate; 46, cathode plate; 47, fourth water distribution plate; 48, second anion permlselective membrane; 49, liquid passing hole; 5, second rubber gasket; 6, second compressing plate; 61, water inlet pipe; and 7, compressing apparatus.

DETAILED DESCRIPTION OF THE EMBODIMENTS

To make the technical problems resolved by the present application, technical solutions, and advantageous effects clearer and more comprehensible, the following further describes the present application in detail with reference to the accompanying drawings and embodiments. It is to be understood that the specific embodiments described herein are merely used for explaining the present application but are not intended to limit the present application.

It should be noted that, when a component is referred to as "being fixed to" or "being arranged on" another component, the component may be directly on the another component, or indirectly on the another element. When one component is referred to as "being connected to" another component, the component may be directly connected to the another component, or indirectly connected to the another element.

It should be understood that orientation or position relationships indicated by the terms such as "length", "width", "above", "below", "front", "rear", "left", "right", "vertical", "horizontal", "top", "bottom", "inside", and "outside" are based on orientation or position relationships shown in the accompanying drawings, and are used only for ease and brevity of illustration and description, rather than indicating or implying that the mentioned apparatus or component needs to have a particular orientation or needs to be constructed and operated in a particular orientation. Therefore, such terms should not be construed as limiting of the present application.

In addition, the terms "first" and "second" are used merely for the purpose of description, and shall not be construed as indicating or implying relative importance or implying a quantity of indicated technical features. Therefore, a feature defined by "first" or "second" can explicitly or implicitly includes one or more features. In the descriptions of the present application, "a plurality of" means two or more, unless otherwise definitely and specifically limited.

As shown in FIG. 1 to FIG. 8, a membrane-stacked electrolytic bath for lithium extraction from salt lakes by electrochemical intercalation/deintercalation provided by an embodiment of the present application is described below. The membrane-stacked electrolytic bath for lithium extraction from salt lakes by electrochemical intercalation/deintercalation includes: a positioning supporting plate 1, as well as a first compressing plate 2, a first rubber gasket 3, at least one electrochemical intercalation/deintercalation unit 4, a second rubber gasket 5 and a second compressing plate 6 sequentially arranged on the positioning supporting plate 1 in an overlapped manner. The first compressing plate 2 is attached to the positioning supporting plate 1, and a compressing apparatus 7 for abutting against the second compressing plate 6 is arranged on one side of the second compressing plate 6, so as to enable peripheral edges of the first compressing plate 2, the first rubber gasket 3, the electrochemical intercalation/deintercalation unit 4, the second rubber gasket 5 and the second compressing plate 6 to be sealed, so that lithium can only flow from the middle for extraction. Specifically, the first compressing plate 2 is provided with water outlet pipes 21 communicated with the electrochemical intercalation/deintercalation unit 4, and the second compressing plate 6 is provided with water inlet pipes 61 communicated with the electrochemical intercalation/deintercalation unit 4. The water inlet pipes 61 are configured to guide a solution into the electrochemical intercalation/deintercalation unit 4, and the solution is discharged from the water outlet pipes 21 after lithium extraction by the electrochemical intercalation/deintercalation unit 4.

In this embodiment, the peripheral edges of the first compressing plate 2, the first rubber gasket 3, the electrochemical intercalation/deintercalation unit 4, the second rubber gasket 5 and the second compressing plate 6 are sealed and overlapped, thus assembling is convenient, and water leakage is prevented. In addition, the electrochemical unit is modularized, so the spacing between electrodes is reduced, the solution resistance can be better reduced, the power consumption for lithium extraction is reduced, and energy-saving extraction of lithium resources from the salt lakes is realized. Due to the modularization of the electrochemical intercalation/deintercalation unit 4, the solution is uniformly distributed during internal flowing, thus the concentration difference is reduced, the reaction rate is increased, and the lithium extraction rate is increased.

Figure 2:
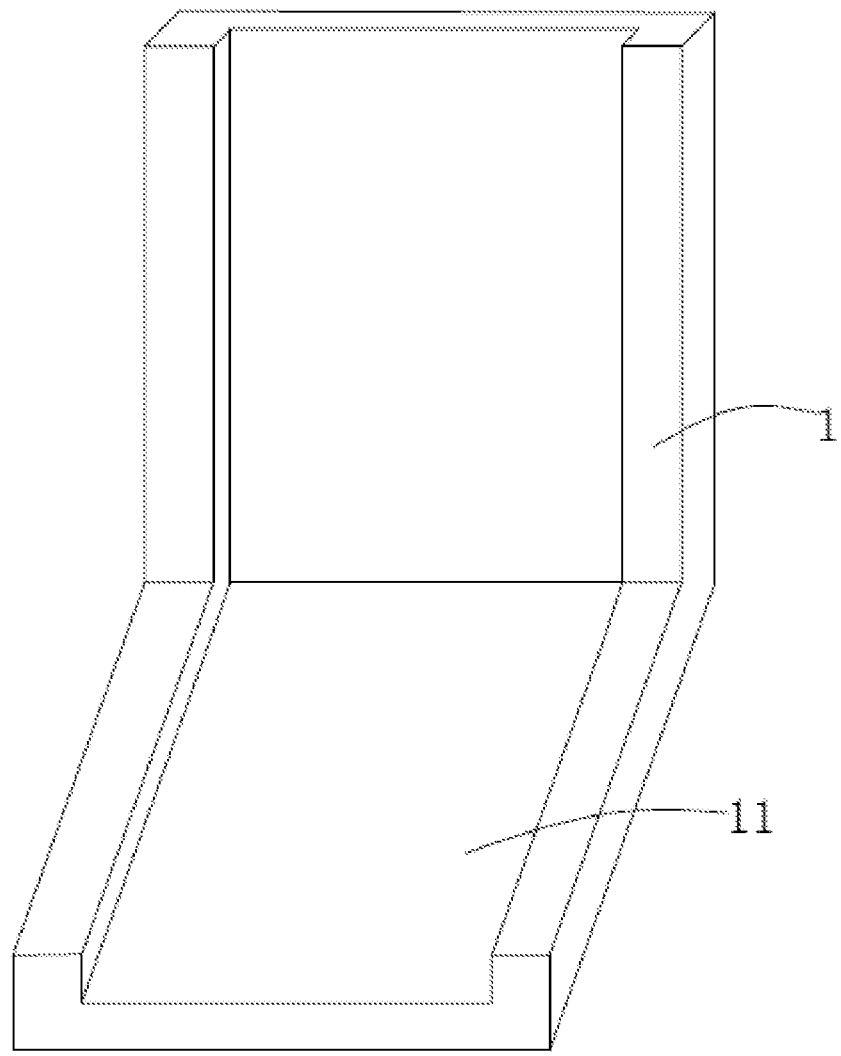
FIG. 2 is a schematic structure diagram of a positioning supporting plate in a membrane-stacked electrolytic bath for lithium extraction from salt lakes by electrochemical intercalation/deintercalation provided by an embodiment of the present application.

As shown in FIG. 1 and FIG. 2, in this embodiment, the positioning supporting plate 1 is an L-shaped antirust steel plate, and a thickness of the positioning supporting plate 1 is 5-100 mm. Specifically, an L-shaped positioning groove 11 is formed in the positioning supporting plate 1, so that the first compressing plate 2, the first rubber gasket 3, the electrochemical intercalation/deintercalation unit 4, the second rubber gasket 5 and the second compressing plate 6 can be conveniently arranged on the positioning supporting plate 1 in the overlapped manner, and the mounting efficiency and the overlapping quality are guaranteed.

Figure 3:
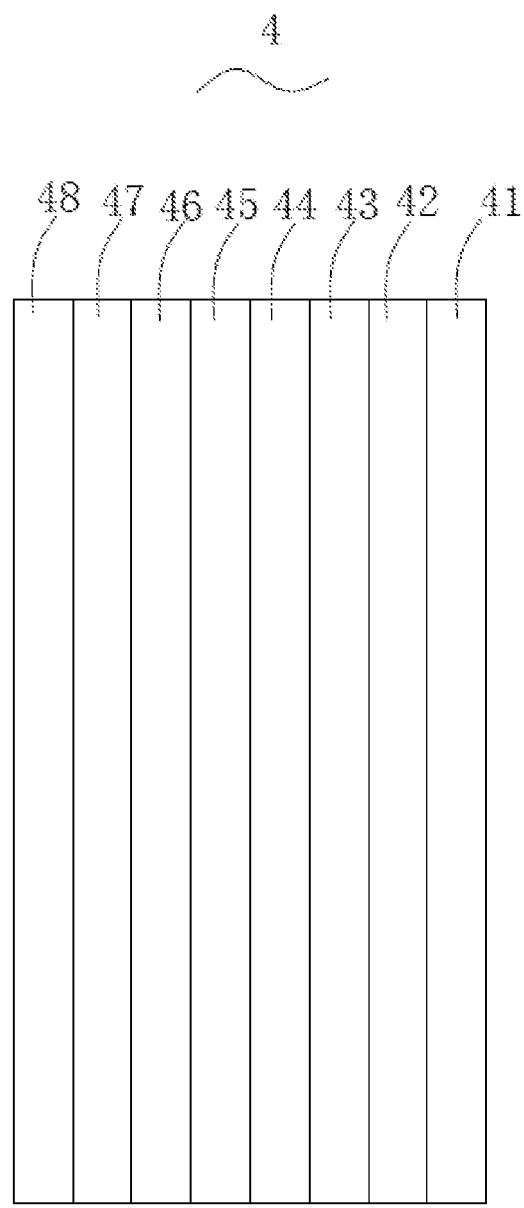
FIG. 3 is a schematic structure diagram of composition of an electrochemical intercalation/deintercalation unit in a membrane-stacked electrolytic bath for lithium extraction from salt lakes by electrochemical intercalation/deintercalation provided by an embodiment of the present application.

As shown in FIG. 1 and FIG. 3, in this embodiment, the electrochemical intercalation/deintercalation unit 4 includes a first water distribution plate 41, an anode plate 42, a second water distribution plate 43, a first anion permlselective membrane 44, a third water distribution plate 45, a cathode plate 46, a fourth water distribution plate 47 and a second anion permlselective membrane 48 which are sequentially arranged in an overlapped manner. The first water distribution plate 41, the anode plate 42, the second water distribution plate 43, the first anion permlselective membrane 44, the third water distribution plate 45, the cathode plate 46, the fourth water distribution plate 47 and the second anion permlselective membrane 48 are each provided with a plurality of liquid passing holes 49 arranged at equal intervals. The water distribution plates are configured to evenly distribute the solution on the anode plate 42 or the cathode plate 46, thus ensuring the concentration uniformity. In this embodiment, the cathode plate 46 and the anode plate 42 are close to each other, so that the electrode spacing is reduced.

The number of the liquid passing holes 49 is greater than or equal to the number of the water inlet pipes 61 or the water outlet pipes 21, and the corresponding water inlet pipes 61 or water outlet pipes 21 and the corresponding liquid passing holes 49 are positioned on a same axis. The solution guided by the water inlet pipes 61 is guided into the liquid passing holes 49 in the second anion permlselective membrane 48, and then is uniformly distributed on the cathode plate 46 through the liquid passing holes 49 in the fourth water distribution plate 47, thus realizing uniform distribution of the solution. In this embodiment, the first water distribution plate 41, the second water distribution plate 43, the third water distribution plate 45 and the fourth water distribution plate 47 all are one of PVC plates, PE plates, PP plates and PPH plates, and preferably the PP plates. A thickness of each water distribution plate is 2-3 mm.

Figure 4:
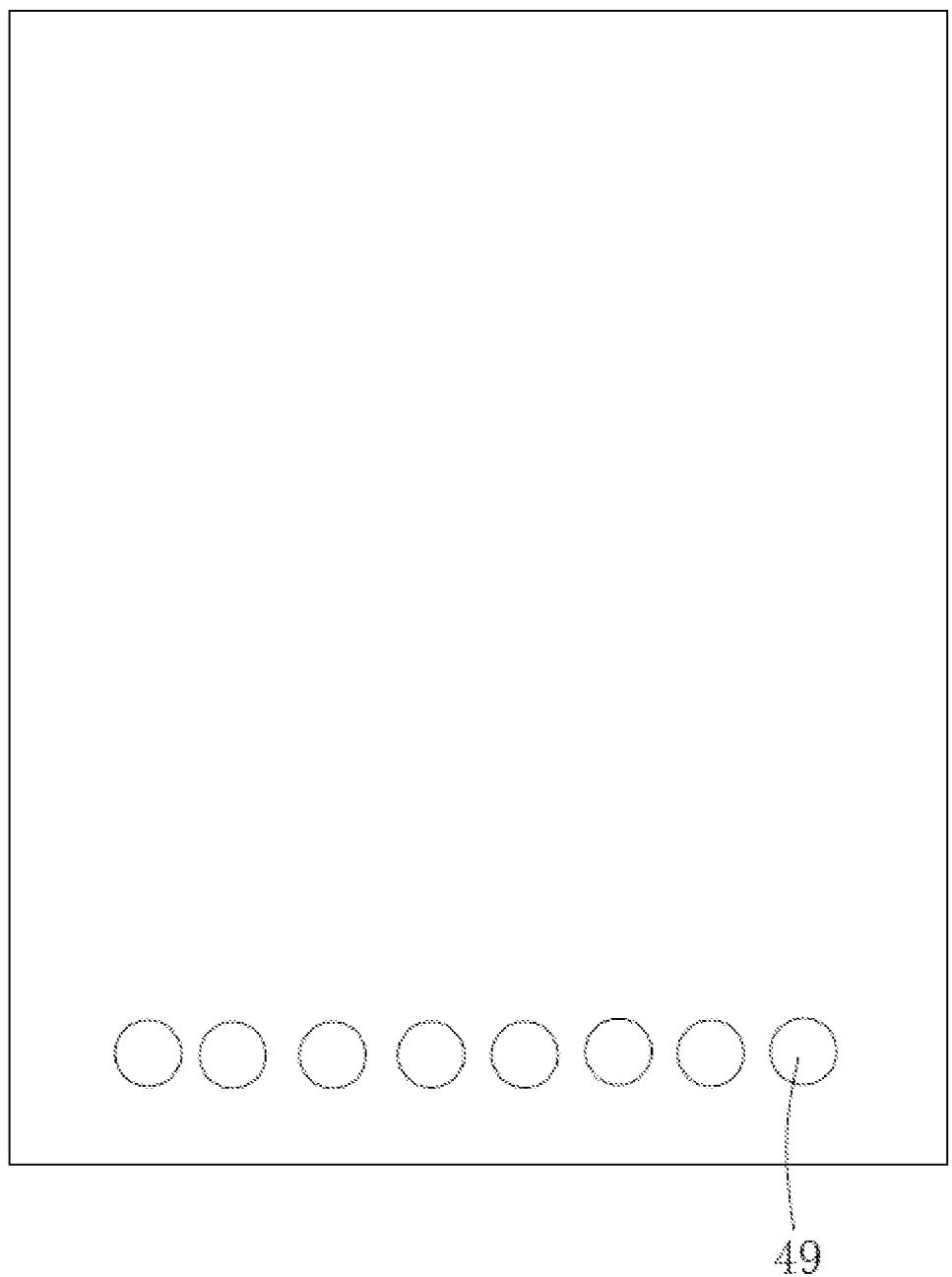
FIG. 4 is a schematic plane structure diagram of a first compressing plate, a first rubber gasket, a second rubber gasket and a second compressing plate in a membrane-stacked electrolytic bath for lithium extraction from salt lakes by electrochemical intercalation/deintercalation provided by an embodiment of the present application.

In this embodiment, as shown in FIG. 1 and FIG. 4, the first compressing plate 2 and the second compressing plate 6 are antirust steel plates, and thicknesses of the first compressing plate 2 and the second compressing plate 6 are 5-100 mm. Specifically, in this embodiment, the first compressing plate 2 and the second compressing plate 6 are of the same structure. At least six liquid passing holes 49 are formed in the first compressing plate 2 and the second compressing plate 6 at equal intervals; at least six water outlet pipes 21 are arranged on the first compressing plate 2 at equal intervals; and at least six water inlet pipes 61 are arranged on the second compressing plate 6 at equal intervals. Similarly, at least six liquid passing holes 49 are formed in the first rubber gasket 3 and the second rubber gasket 5 at equal intervals. The water outlet pipes 21 respectively communicate with the liquid passing holes 49 in the first compressing plate 2 and the first rubber gasket 3; and the water inlet pipes 61 respectively communicate with the liquid passing holes 49 in the second compressing plate 6 and the second rubber gasket 5.

As shown in FIG. 1 and FIG. 4, the first rubber gasket 3 and the second rubber gasket 5 both are nitrile rubber gaskets, chloroprene rubber gaskets, ethylene-propylene-diene monomer gaskets or silicone rubber gaskets with thicknesses of 3-20 mm, preferably the silicone rubber gaskets.

Figure 5:
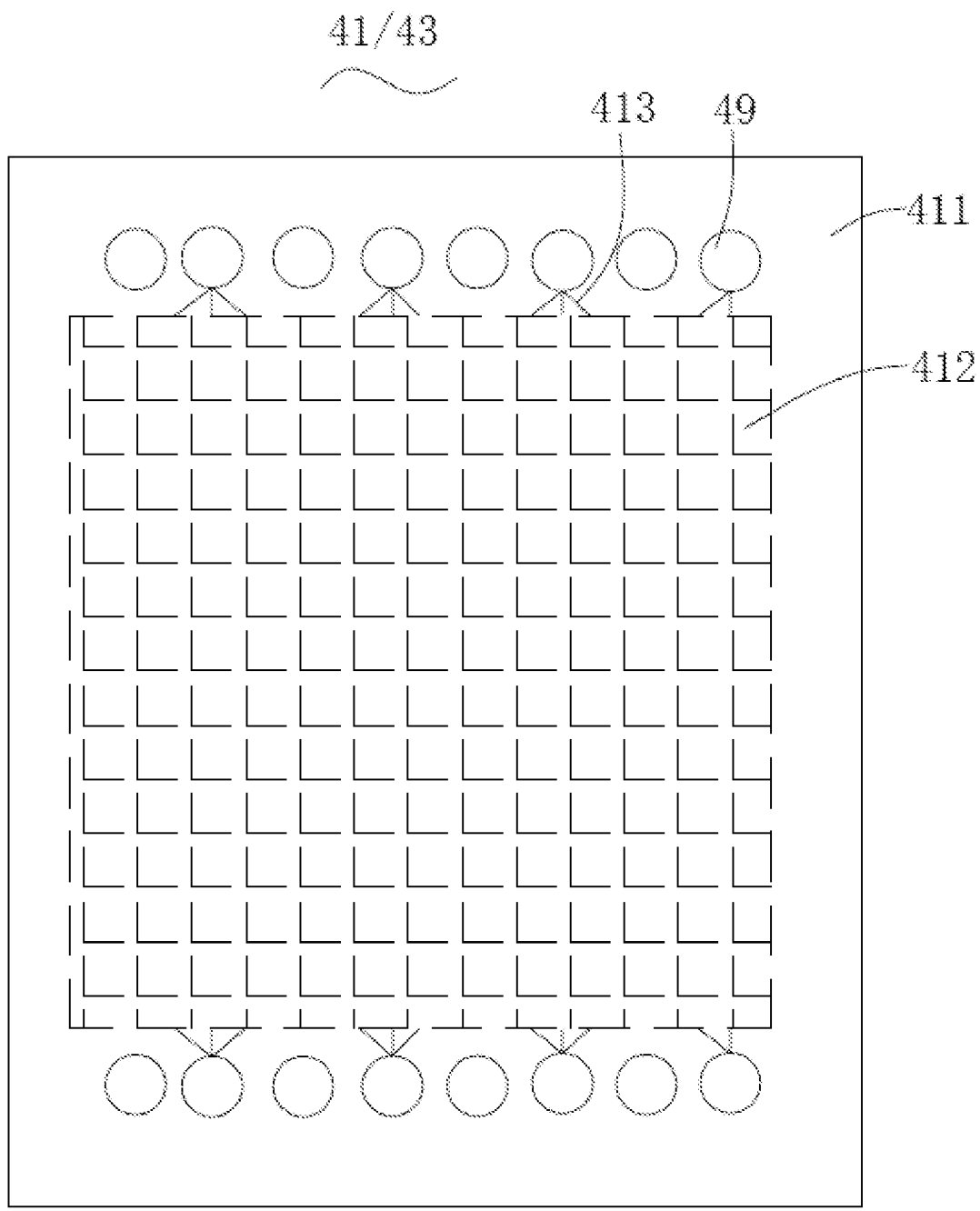
FIG. 5 is a schematic plane structure diagram of a first water distribution plate and a second water distribution plate in a membrane-stacked electrolytic bath for lithium extraction from salt lakes by electrochemical intercalation/deintercalation provided by an embodiment of the present application.
Figure 6:
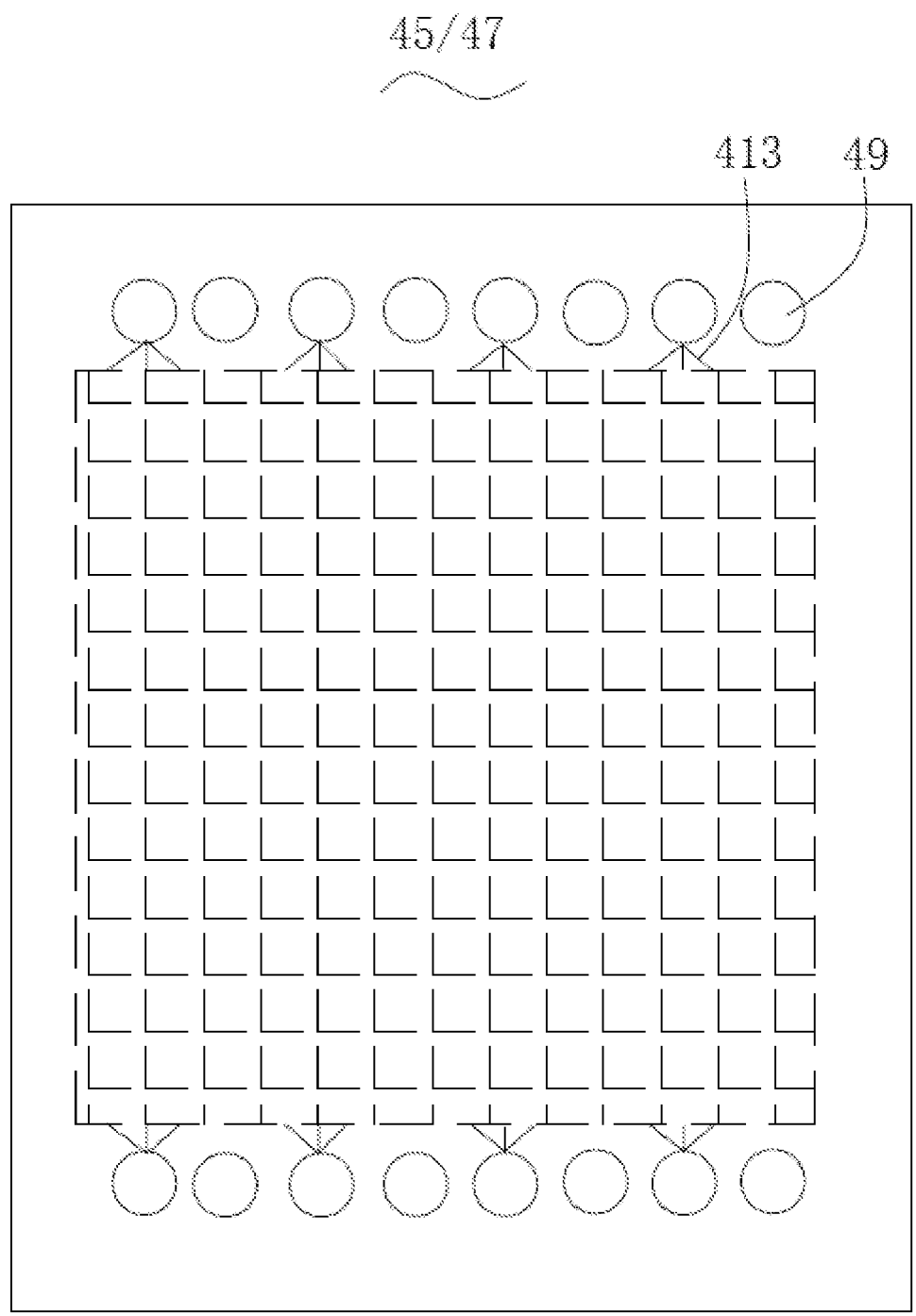
FIG. 6 is a schematic plane structure diagram of a third water distribution plate and a fourth water distribution plate in a membrane-stacked electrolytic bath for lithium extraction from salt lakes by electrochemical intercalation/deintercalation provided by an embodiment of the present application.
Figure 7:
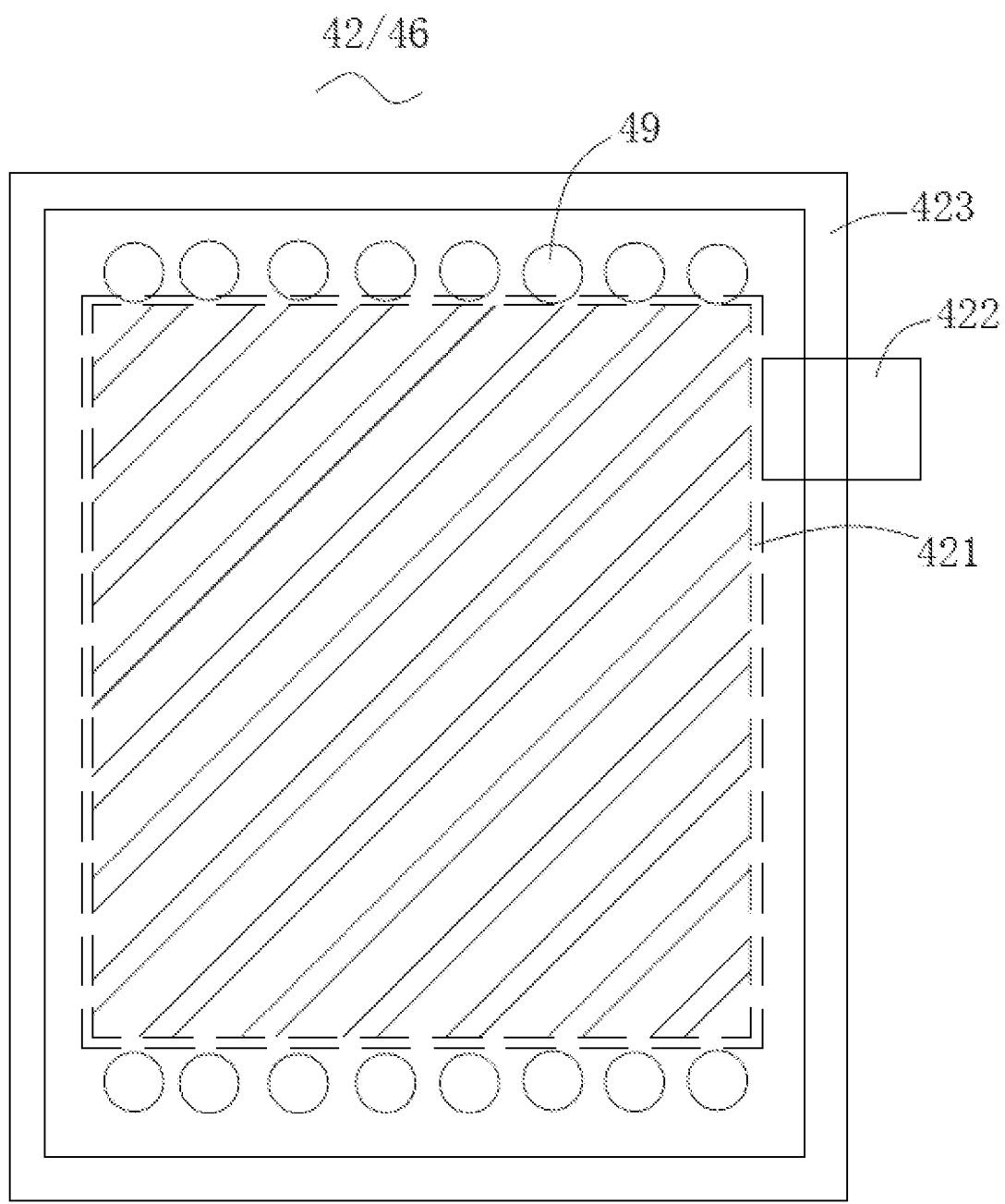
FIG. 7 is a schematic plane structure diagram of a cathode plate or an anode plate in a membrane-stacked electrolytic bath for lithium extraction from salt lakes by electrochemical intercalation/deintercalation provided by an embodiment of the present application.

As shown in FIG. 1, FIG. 5 and FIG. 6, in this embodiment, the first water distribution plate 41, the second water distribution plate 43, the third water distribution plate 45 and the fourth water distribution plate 47 each includes a water distribution frame 411, a water distribution grid 412 arranged in the water distribution frame 411, and fluid flow channels 413 arranged in the water distribution frame 411. One end of the fluid flow channel communicates with the water distribution grid 412 and the other end communicates with the corresponding liquid passing hole 49. The fluid flow channels in the first water distribution plate 41 and the second water distribution plate 43 are staggered from the fluid flow channels in the third water distribution plate 45 and the fourth water distribution plate 47. In this embodiment, the water distribution grid 412 has a size of 3-5 mm×6-10 mm. The fluid flow channel 413 has a width of 2-3 mm and a depth of 1-2 mm.

Specifically, the liquid passing holes 49 in each water distribution plate are arranged in a row at each of two ends of the water distribution plate respectively, and each row is provided with eight liquid passing holes 49 at equal intervals. Eight fluid channels 413 are arranged in the first water distribution plate 41 and the second water distribution plate 43 and communicate with the second, fourth, sixth and eighth liquid passing holes 49 in the upper row and the lower row respectively; and eight fluid channels 413 are arranged in the third water distribution plate 45 and the fourth water distribution plate 47 and communicate with the first, third, fifth and seventh liquid passing holes 49 in the upper row and the lower row respectively, and therefore staggered arrangement of the liquid passing holes 49 is achieved. Due to the staggered arrangement of the liquid passing holes 49, brine and lithium-enriched liquid can be fed separately.

Figure 8:
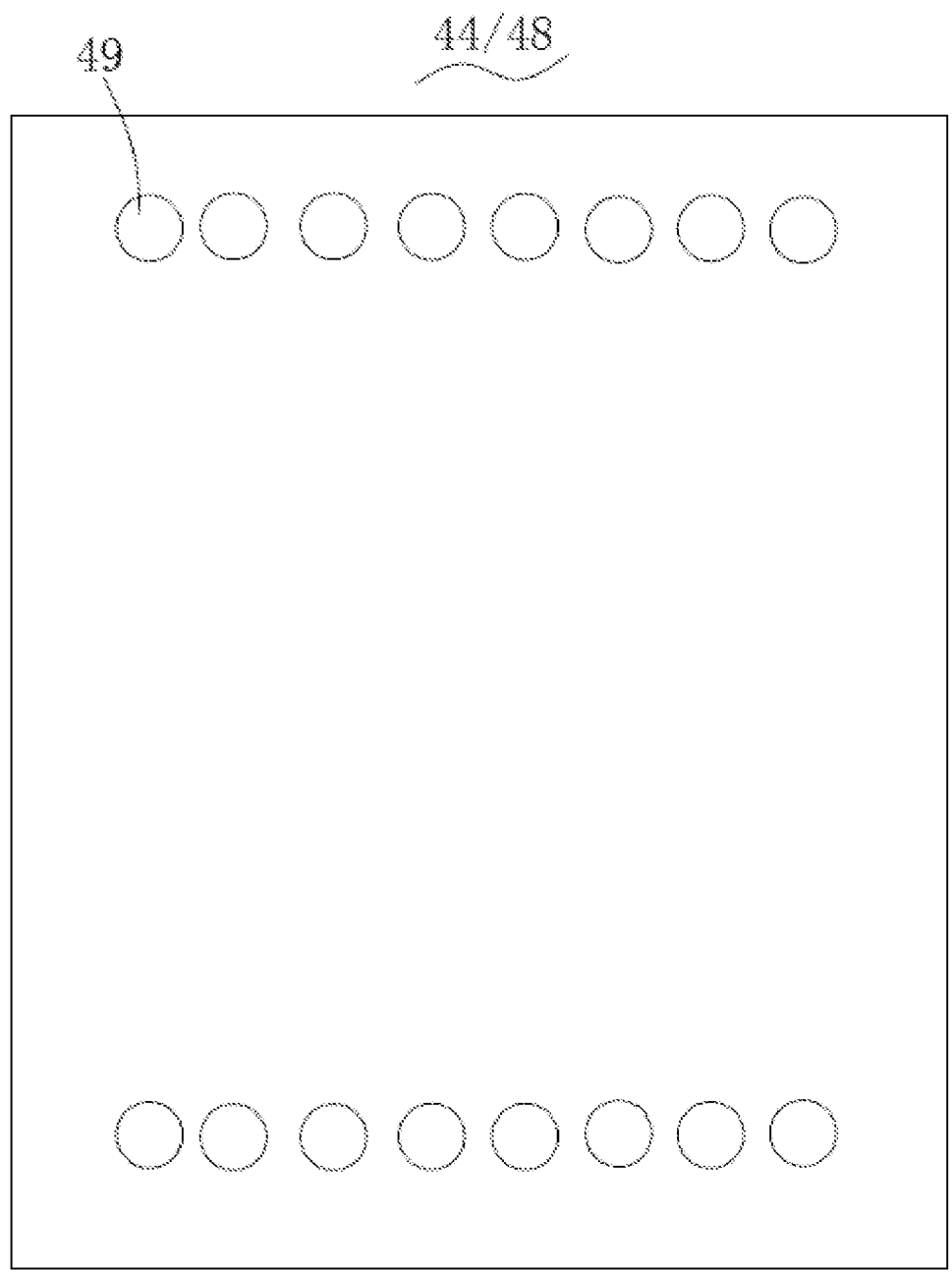
FIG. 8 is a schematic plane structure diagram of a first anion permlselective membrane and a second anion permlselective membrane in a membrane-stacked electrolytic bath for lithium extraction from salt lakes by electrochemical intercalation/deintercalation provided by an embodiment of the present application.

In this embodiment, the anode plate 42 is an anode plate 42 coated with a lithium-intercalated active substance, and the cathode plate 46 is a cathode plate 46 coated with a lithium-deficient active substance. Therefore, efficient electrochemical extraction of lithium resources from salt lake brine can be achieved. As shown in FIG. 8, the first anion permlselective membrane 44 and the second anion permlselective membrane 48 both are monovalent anion permlselective membranes with thicknesses of less than 0.5 mm and resistances of less than 30 $\Omega/cm^2$. Therefore, impurity cations and divalent anions in brine can be prevented from permeating the anion membranes, and a relatively clean lithium chloride solution can be obtained.

Specifically, the lithium-intercalated active substance is one of $LiFePO_4$, $LiMn_2O_4$ and $LiNi_xCo_yMn_{1-x-y}O_2$, where $0<x+y<1$, and the lithium-deficient active substance is one of $Li_{1-x}FePO_4$, $Li_{1-x}Mn_2O_4$ and $Li_{1-x}Ni_yCo_zMn_{1-y-z}O_2$, where $0<x<1$, and $0<y+z<1$.

In this embodiment, current collectors 421 and tabs 422 on the cathode plate 46 and the anode plate 42 are one of titanium meshes, titanium foils and carbon fiber cloth.

In this embodiment, sealing strips 423 are arranged on peripheral edges of the cathode plate 46 and the anode plate 42. Therefore, the membrane-stacked electrolytic bath can be prevented from water leakage and water mixing, the electrode spacing between the cathode and the anode can be reduced, and the solution resistance and the power consumption for lithium extraction can be decreased. The sealing strips 423 can be one of adhesive rubber strips, direct vulcanized rubber strips and the like, and the rubber is preferably silicone rubber.

In this embodiment, the solution refers to raw materials such as brine and lithium-enriched liquid. In order to ensure smooth feeding of the brine and the lithium-enriched liquid in the membrane-stacked electrolytic bath, all the rubber gaskets, all the water distribution plates, all the anion permlselective membrane, the cathode plate 46 and the anode plate 42 are arranged to be consistent in size, and the liquid passing holes 49 communicating with one another are coaxially formed in the rubber gaskets, the water distribution plates, the anion permlselective membranes, the cathode plate and the anode plate. The aperture of the liquid passing hole 49 is 15-50 mm.

In this embodiment, in order to quickly, simply and conveniently compress and fix the membrane-stacked electrolytic bath, the compressing apparatus 7 is a hydraulic machine or a pneumatic cylinder configured to compress the second compressing plate 6, or a screw rod can also be adopted for compressing.

In this embodiment, the electrode plates of the membrane-stacked electrolytic bath for lithium extraction from salt lakes by electrochemical intercalation/deintercalation are subjected to edge covering treatment through the sealing strips 423, thus the spacing between the electrodes is small while water leakage and water mixing are effectively prevented, the solution resistance can be reduced, then the bath voltage in the electrochemical intercalation/deintercalation process is reduced, the power consumption for lithium extraction is reduced, and energy-saving extraction of the lithium resources from the salt lakes is achieved. Through the adoption of the water distribution plates for feeding, a flow field is uniform, "dead zones" in the electrolytic bath are greatly reduced, thus concentration polarization can be reduced, the reaction rate can be increased, and efficient extraction of the lithium resources from the salt lakes can be achieved. All the plates are tightly attached, accordingly, the size of a cathode chamber and the size of an anode chamber are small, therefore the volume of the lithium-enriched liquid can be reduced, then a high-concentration lithium-containing solution can be obtained, and the energy consumption in subsequent concentration process is greatly reduced.

In a specific implementation 1 of this embodiment:

The positioning supporting plate 1 with the thickness of 5 mm is adopted; and the first compressing plate 2 with the thickness of 5 mm, the first rubber gasket 3 with the thickness of 3 mm, the first water distribution plate 41 with the thickness of 2 mm, the anode plate 42 with the thickness of 4 mm and subjected to edge covering by the sealing strips 423, the second water distribution plate 43 with the thickness of 2 mm, the first anion permlselective membrane 44, the third water distribution plate with the thickness of 2 mm, the cathode plate 46 with the thickness of 4 mm and subjected to edge covering by the sealing strips 423, the fourth water distribution plate 47 with the thickness of 2 mm and the second rubber gasket 5 with the thickness of 3 mm are sequentially arranged in a flat and aligned manner; and then the second compressing plate 6 with the thickness of 5 mm is placed. In this embodiment, a few electrochemical intercalation/deintercalation units 4 are provided and can be compressed by screw rods and fixed by matched nuts. The length of the screw rod is 150 mm, and a diameter of the screw rod is 16 mm. The diameter of steel pipes welded on all the compressing plates is 15 mm, and 6 steel pipes are welded. The rubber gaskets are the chloroprene rubber gaskets. The water distribution plates are made of a PVC material; the size of the water distribution grids 412 of the water distribution plates is 3 mm×6 mm; the width of the liquid flow channel is 2 mm; the depth of the liquid flow channel is 1 mm; and the liquid flow channels in all the water distribution plates are mutually staggered. All the water distribution plates, all the anion permlselective membranes, the cathode plate 46 and the anode plate 42 are respectively provided with 6 liquid passing holes 49 which are 15 mm in diameter, uniform in distribution and the same in position. The rubber type of the sealing strips 423 of the anode plate 42 and the cathode plate 46 is chlorinated butyl rubber; the lithium-intercalated active substance coating the anode plate is $LiFePO_4$; and the lithium-deficient active substance coating the cathode is $Li_{1-x}FePO_4$.

A membrane-stacked intercalation/deintercalation bath of the single intercalation/deintercalation unit is connected with an external pipeline, and then certain salt lake brine is treated by electrochemical intercalation/deintercalation based on the membrane-stacked electrolytic bath, where the volume of the brine is 25 L, and the volume of the lithium-enriched liquid is 5 L. The lithium concentration of the brine and the lithium concentration of the lithium-enriched liquid are sampled and analyzed, and the power consumption and the current density are calculated. The main chemical components of the brine and the lithium-enriched liquid before and after lithium extraction are shown in Table 1. As shown in Table 1, the membrane-stacked electrolytic bath is adopted for electrochemical intercalation/deintercalation for lithium extraction, the yield of lithium reaches 86.57%, and the lithium concentration of the obtained lithium-enriched liquid reaches 3.1 g/L, which is 4.6 times of the initial lithium concentration of the brine. The current density in the lithium extraction process is 28 A/m2, the bath pressure is 0.35 V, and the power consumption of the membrane-stacked electrolytic bath for electrochemical lithium extraction is only 1.78 Wh/g (Li) through calculation. It can be seen from the above data that the membrane-stacked electrolytic bath for lithium extraction from salt lakes by electrochemical intercalation/deintercalation has the advantages of low power consumption, high lithium concentration of the obtained lithium-enriched liquid, large current density and the like.

TABLE 1

Main chemical components of brine and lithium-enriched liquid before and after lithium extraction

| Chemical components | Li | Na | K | Ca | Mg | SO42− |
|---|---|---|---|---|---|---|
| Initial brine | 0.67 | 58.06 | 6.62 | 0.48 | 2.09 | 7.26 |
| Final brine | 0.09 | 57.13 | 6.34 | 0.43 | 2.05 | 7.11 |
| Initial lithium-enriched liquid | 0.21 | 0.32 | 0.05 | / | / | / |
| Final lithium-enriched liquid | 3.08 | 1.29 | 0.19 | 0.12 | 0.26 | 0.98 |

In a specific implementation 2 of this embodiment:

This embodiment provides a membrane-stacked electrolytic bath including 25 electrochemical intercalation/deintercalation units 4. The membrane-stacked electrolytic bath including 25 electrochemical intercalation/deintercalation units 4 is assembled according to the following steps:

The positioning supporting plate 1 with the thickness of 30 mm is adopted for positioning; and the first compressing plate 2 with the thickness of 30 mm, the first rubber gasket 3 with the thickness of 8 mm, the 25 electrochemical intercalation/deintercalation units 4 (sequentially are the first water distribution plate 41 with the thickness of 2.5 mm, the anode plate 42 with the thickness of 6 mm and subjected to edge covering by the sealing strips 423, the second water distribution plate 43 with the thickness of 2.5 mm, the first anion permlselective membrane 44, the third water distribution plate with the thickness of 2.5 mm, the cathode plate 46 with the thickness of 6 mm and subjected to edge covering by the sealing strips 423, the fourth water distribution plate 47 with the thickness of 2.5 mm and the second anion permlselective membrane 48) and the second rubber gasket 5 with the thickness of 8 mm are sequentially placed in a flat and aligned manner; and then the second compressing plate 6 with the thickness of 30 mm is placed and compressed and fixed through a hydraulic machine. The diameter of steel pipes (the steel pipes refer to the water inlet pipes 61 or the water outlet pipes 21) welded in all the compressing plates is 25 mm, and 8 steel pipes are welded. All the rubber gaskets are nitrile rubber gaskets. All the water distribution plates are made of a PE material; the size of the water distribution grids 412 of the water distribution plates is 4 mm×8 mm; the width of the liquid flow channels is 2.5 mm; the depth of the liquid flow channels is 1.5 mm; and the liquid flow channels of all the water distribution plates are staggered. All the water distribution plates, all the anion permlselective membranes, the cathode plate 46 and the anode plate 42 are provided with 8 liquid passing holes 49 which are 25 mm in diameter, uniform in distribution and the same in position. The rubber type of the sealing strips 423 on the peripheries of the anode plate 42 and the cathode plate 46 is chlorinated butyl rubber; the lithium-intercalated active substance coating the cathode plate 42 is $LiMn_2O_4$; and the lithium-deficient active substance coating the cathode plate 46 is $Li_{1-x}Mn_2O_4$.

The membrane-stacked intercalation/deintercalation bathes of the 25 intercalation/deintercalation units are placed to be connected with an external pipeline, then salt lake brine from south America is treated by electrochemical intercalation/deintercalation based on the membrane-stacked electrolytic bath, where the volume of the brine is 1500 L, and the volume of the lithium-enriched liquid is 150 L. The lithium concentration of the brine before and after lithium extraction is 0.38 g/L and 0.05 g/L respectively, and the yield of lithium reaches 86.84%; and the lithium concentration of the final lithium-enriched liquid reaches 3.5 g/L, which is 9.2 times of the initial lithium concentration of the brine. In the lithium extraction process, the current density is 25 A/m2, the bath voltage is 0.6 V, and the power consumption of the membrane-stacked electrolytic bath for electrochemical lithium extraction is only 2.88 Wh/g (Li) through calculation.

In a specific implementation 3 of this embodiment:

This embodiment provides a membrane-stacked electrolytic bath including 50 intercalation/deintercalation units. The membrane-stacked electrolytic bath including 50 intercalation/deintercalation units is assembled according to the following steps:

The positioning supporting plate 1 with the thickness of 80 mm is adopted; and the first compressing plate 2 with the thickness of 80 mm, the first rubber gasket 3 with the thickness of 12 mm, the 50 intercalation/deintercalation units (sequentially are the first water distribution plate 41 with the thickness of 3 mm, the anode plate 42 with the thickness of 10 mm and subjected to edge covering by the sealing strips 423, the second water distribution plate 43 with the thickness of 3 mm, the first anion permlselective membrane 44, the third water distribution plate 45 with the thickness of 3 mm, the cathode plate 46 with the thickness of 10 mm and subjected to edge covering by the sealing strips 423, the fourth water distribution plate 47 with the thickness of 3 mm and the second anion permlselective membrane 48) and the second rubber gasket 5 with the thickness of 8 mm are sequentially placed in a flat and aligned manner; and then the second compressing plate 6 with the thickness of 80 mm is placed and compressed and fixed through a hydraulic machine. The diameter of steel pipes in the compressing plates is 32 mm, and 8 steel pipes are provided. The rubber gaskets are ethylene-propylene-diene monomer gaskets. All the water distribution plates are made of a PP material; the size of the water distribution grids 412 of the water distribution plates is 5 mm×10 mm; the width of the liquid flow channels is 2.5 mm; the depth of the liquid flow channels is 2 mm; and the liquid flow channels of all the water distribution plates are staggered. All the water distribution plates, all the anion permlselective membranes, the cathode plate 46 and the anode plate 42 are provided with 8 liquid passing holes 49 which are 32 mm in diameter, uniform in distribution and the same in position. The rubber type of the sealing strips 423 of the anode plate 42 and the anode plate 46 is ethylene-propylene-diene monomer; the lithium-intercalated active substance coating the cathode plate 42 is LiFePO$_4$; and the lithium-deficient active substance coating the cathode plate 46 is Li$_{1-x}$FePO$_4$.

The membrane-stacked intercalation/deintercalation bathes of the 50 intercalation/deintercalation units are placed on the positioning supporting plate 1 and are connected with an external pipeline. Then certain salt lake brine with the lithium concentration of 0.61 g/L is treated by electrochemical intercalation/deintercalation based on the membrane-stacked electrolytic bath, where the volume of the brine is 6000 L, and the volume of the lithium-enriched liquid is 700 L. The lithium concentration of the brine after lithium extraction is reduced to be 0.04 g/L, and the yield of lithium reaches 91.80%; and the lithium concentration of the final lithium-enriched liquid reaches 5.1 g/L, which is 8.3 times of the initial lithium concentration of the brine. In the lithium extraction process, the current density is 26 A/m2, the bath voltage is 0.33 V, and the power consumption of the membrane-stacked electrolytic bath for electrochemical lithium extraction is only 1.69 Wh/g (Li) through calculation.

In a specific implementation 4 of this embodiment:

This embodiment provides a membrane-stacked electrolytic bath including 100 intercalation/deintercalation units. The membrane-stacked electrolytic bath including 100 intercalation/deintercalation units is assembled according to the following steps:

A supporting plate with the thickness of 100 mm is used as the positioning supporting plate 1; and the first compressing plate 2 with the thickness of 100 mm, the first rubber gasket 3 with the thickness of 20 mm, the 100 intercalation/deintercalation units (sequentially are the first water distribution plate 41 with the thickness of 3 mm, the anode plate 42 with the thickness of 8 mm and subjected to edge covering by the sealing strips 423, the second water distribution plate 43 with the thickness of 3 mm, the first anion permlselective membrane 44, the third water distribution plate 45 with the thickness of 3 mm, the cathode plate 46 with the thickness of 8 mm and subjected to edge covering by the sealing strips 423, the fourth water distribution plate 47 with the thickness of 3 mm and the second anion permlselective membrane 48) and the second rubber gasket 5 with the thickness of 20 mm are sequentially placed in a flat and aligned manner; and then the second compressing plate 6 with the thickness of 100 mm is placed and compressed and fixed through a hydraulic machine. The diameter of steel pipes in all the compressing plates is 50 mm, and 10 steel pipes are provided. All the rubber gaskets are ethylene-propylene-diene monomer gaskets. All the water distribution plates are made of a PP material; the size of the water distribution grids 412 of the water distribution plates is 4 mm×8 mm; the width of the liquid flow channels is 3 mm; the depth of the liquid flow channels is 1.5 mm; and the liquid flow channels of all the water distribution plates are staggered. All the water distribution plates, all the anion permlselective membranes, the cathode plate 46 and the anode plate 42 are provided with 10 liquid passing holes 49 which are 50 mm in diameter, uniform in distribution and the same in position. The sealing strips 423 of the anode plate 42 and the anode plate 46 are made of vulcanized rubber, and the rubber type is ethylene-propylene-diene monomer; the lithium-intercalated active substance coating the cathode plate 42 is LiFePO$_4$, and the lithium-deficient active substance coating the cathode plate 46 is Li$_{1-x}$FePO$_4$.

The membrane-stacked intercalation/deintercalation bathes of the 100 intercalation/deintercalation units are placed to be connected with an external pipeline, then old salt lake brine with lithium concentration of 2.3 g/L from Xitaijinaier Salt Lake in Qinghai is treated by electrochemical intercalation/deintercalation based on the membrane-stacked electrolytic bath, where the volume of the brine is 2500 L, and the volume of the lithium-enriched liquid is 900 L. The lithium concentration of the brine after lithium extraction is 0.13 g/L, and the yield of lithium reaches 94.35%; and the lithium concentration of the final lithium-enriched liquid reaches 6.0 g/L, which is about 2.6 times of the initial lithium concentration of the brine. In the lithium extraction process, the current density is 30 A/m2, the bath voltage is 0.38 V, and the power consumption of the membrane-stacked electrolytic bath for electrochemical lithium extraction is only 1.63 Wh/g (Li) through calculation.

The main indexes of lithium extraction by the membrane-stacked electrolytic bath for lithium extraction from salt lakes by electrochemical intercalation/deintercalation implementations 1-4 are summarized and listed in Table 2.

TABLE 2

Main indexes of lithium extraction in implementations 1-4

| Main indexes | Yield of lithium, % | Lithium concentration of the obtained lithium-enriched liquid, g/L | Bath voltage, V | Current density, A/m2 | Power consumption for lithium extraction, Wh/g(Li) |
|---|---|---|---|---|---|
| Mode 1 | 86.57 | 3.1 | 0.35 | 28 | 1.78 |
| Mode 2 | 86.84 | 3.5 | 0.6 | 25 | 2.88 |
| Mode 3 | 91.80 | 5.1 | 0.33 | 26 | 1.69 |
| Mode 4 | 94.35 | 6.0 | 0.38 | 30 | 1.63 |

As shown in Table 2, the membrane-stacked electrolytic bath for lithium extraction from salt lake by electrochemical intercalation/deintercalation can realize efficient and low-energy-consumption extraction of lithium resources in the salt lake brine. The membrane-stacked electrolytic bath has the advantages such as high lithium recovery rate, low bath voltage, high current density and low lithium extraction power consumption. In addition, the lithium-enriched liquid obtained by the membrane-stacked electrolytic bath is high in lithium concentration, and the energy consumption in subsequent concentration process can be greatly reduced.

The foregoing descriptions are merely exemplary embodiments of the present application, and are not intended to limit the present application. Any modification, equivalent replacement, improvement and the like made within the spirit and principle of the present application shall fall within the protection scope of the present application.

What is claimed is:

1. A membrane-stacked electrolytic bath for a lithium extraction from salt lakes by an electrochemical intercalation/deintercalation, comprising: a positioning supporting plate, a first compressing plate, a first rubber gasket, at least one electrochemical intercalation/deintercalation unit, a second rubber gasket, and a second compressing plate, wherein the first compressing plate, the first rubber gasket, the at least one electrochemical intercalation/deintercalation unit, the second rubber gasket, and the second compressing plate are sequentially arranged on the positioning supporting plate in an overlapped manner; a compressing apparatus for abutting against the second compressing plate is arranged on one side of the second compressing plate to enable peripheral edges of the first compressing plate, the first rubber gasket, the at least one electrochemical intercalation/deintercalation unit, the second rubber gasket, and the second compressing plate to be sealed; the first compressing plate is provided with water outlet pipes communicated with the at least one electrochemical intercalation/deintercalation unit, and the second compressing plate is provided with water inlet pipes communicated with the at least one electrochemical intercalation/deintercalation unit;

wherein the at least one electrochemical intercalation/deintercalation unit comprises a first water distribution plate, an anode plate, a second water distribution plate, a first anion permlselective membrane, a third water distribution plate, a cathode plate, a fourth water distribution plate, and a second anion permlselective membrane sequentially arranged in an overlapped manner; the first water distribution plate, the anode plate, the second water distribution plate, the first anion permlselective membrane, the third water distribution plate, the cathode plate, the fourth water distribution plate, and the second anion permlselective membrane are each provided with a plurality of liquid passing holes arranged at equal intervals, wherein a number of the plurality of liquid passing holes is larger than or equal to a number of the water inlet pipes or the water outlet pipes; and corresponding water inlet pipes or corresponding water outlet pipes and corresponding liquid passing holes are positioned on a same axis.

2. The membrane-stacked electrolytic bath for the lithium extraction from the salt lakes by the electrochemical intercalation/deintercalation according to claim 1, wherein the positioning supporting plate is an L-shaped antirust steel plate, and a thickness of the positioning supporting plate is 5-100 mm.

3. The membrane-stacked electrolytic bath for the lithium extraction from the salt lakes by the electrochemical intercalation/deintercalation according to claim 1, wherein the first compressing plate and the second compressing plate are antirust steel plates, and thicknesses of the first compressing plate and the second compressing plate are each 5-100 mm; at least six water outlet pipes are arranged on the first compressing plate at equal intervals; and at least six water inlet pipes are arranged on the second compressing plate at equal intervals.

4. The membrane-stacked electrolytic bath for the lithium extraction from the salt lakes by the electrochemical intercalation/deintercalation according to claim 1, wherein the first rubber gasket and the second rubber gasket both are nitrile rubber gaskets, chloroprene rubber gaskets, ethylene-propylene-diene monomer gaskets, or silicone rubber gaskets, thicknesses of the first rubber gasket and the second rubber gasket are each 3-20 mm; and the first water distribution plate, the second water distribution plate, the third water distribution plate, and the fourth water distribution plate each are one of PVC plates, PE plates, PP plates, and PPH plates.

5. The membrane-stacked electrolytic bath for the lithium extraction from the salt lakes by the electrochemical intercalation/deintercalation according to claim 2, wherein the first water distribution plate, the second water distribution plate, the third water distribution plate, and the fourth water distribution plate each comprise a water distribution frame, a water distribution grid arranged in the water distribution frame, and fluid flow channels arranged in the water distribution frame; a first end of each of the fluid flow channels communicates with the water distribution grid, and a second end of each of the fluid flow channels communicates with the corresponding liquid passing holes; and the fluid flow channels in the first water distribution plate and the second water distribution plate are staggered from the fluid flow channels in the third water distribution plate and the fourth water distribution plate.

6. The membrane-stacked electrolytic bath for the lithium extraction from the salt lakes by the electrochemical intercalation/deintercalation according to claim 1, wherein the anode plate is coated with a lithium-intercalated active substance; the cathode plate is coated with a lithium-deficient active substance; and the first anion permlselective membrane and the second anion permlselective membrane both are monovalent anion permlselective membranes with thicknesses of less than 0.5 mm and resistances of less than 30 $\Omega/cm^2$.

7. The membrane-stacked electrolytic bath for the lithium extraction from the salt lakes by the electrochemical intercalation/deintercalation according to claim 6, wherein the lithium-intercalated active substance is one of $LiFePO_4$, $LiMn_2O_4$, and $LiNi_xCo_yMn_{1-x-y}O_2$, wherein $0<x+y<1$, and the lithium-deficient active substance is one of $Li_{1-x}FePO_4$, $Li_{1-x}Mn_2O_4$, and $Li_{1-x}Ni_yCo_zMn_{1-y-z}O_2$, wherein $0<x<1$, and $0<y+z<1$.

8. The membrane-stacked electrolytic bath for the lithium extraction from the salt lakes by the electrochemical intercalation/deintercalation according to claim 7, wherein current collectors and tabs on the cathode plate and the anode plate are one of titanium meshes, titanium foils, and carbon fiber cloth.

9. The membrane-stacked electrolytic bath for the lithium extraction from the salt lakes by the electrochemical intercalation/deintercalation according to claim 8, wherein sealing strips are arranged on peripheral edges of the cathode plate and the anode plate.

* * * * *